United States Patent
Frey et al.

(10) Patent No.: US 11,768,315 B1
(45) Date of Patent: Sep. 26, 2023

(54) DIRECTIONAL ELECTROMAGNETIC RATIO CALIBRATION

(71) Applicant: Schlumberger Technology Corporation, Sugar Land, TX (US)

(72) Inventors: Mark Frey, Sugar Land, TX (US); Dean Homan, Damon, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 17/657,759

(22) Filed: Apr. 4, 2022

(51) Int. Cl.
*G01V 13/00* (2006.01)
*G01V 3/30* (2006.01)

(52) U.S. Cl.
CPC ............ *G01V 13/00* (2013.01); *G01V 3/30* (2013.01)

(58) Field of Classification Search
None
See application file for complete search history.

(56) References Cited

U.S. PATENT DOCUMENTS

| | | |
|---|---|---|
| 2009/0157316 A1 | 6/2009 | Alumbaugh et al. |
| 2011/0074427 A1 | 3/2011 | Wang |
| 2015/0177412 A1 | 6/2015 | San Martin et al. |
| 2015/0276972 A1 | 10/2015 | Frey |
| 2016/0116628 A1 | 4/2016 | Frey |
| 2016/0170068 A1 | 6/2016 | Donderici |
| 2018/0321413 A1 | 11/2018 | Zhong et al. |
| 2019/0137646 A1* | 5/2019 | Frey .................... G01V 3/12 |
| 2019/0331830 A1 | 10/2019 | Li et al. |

FOREIGN PATENT DOCUMENTS

EP 3126630 A1 2/2017

OTHER PUBLICATIONS

International Search Report and Written Opinion issued in International Patent application PCT/US2023/017367 dated Jul. 26, 2023, 10 pages.

\* cited by examiner

*Primary Examiner* — Douglas X Rodriguez
(74) *Attorney, Agent, or Firm* — Jeffrey D. Frantz

(57) ABSTRACT

A method for making calibrated directional electromagnetic logging measurements includes causing an electromagnetic logging tool to make a plurality of voltage measurements while deployed in a subterranean wellbore. A ratio of currents in first and second electromagnetic transmitters is computed and a ratio of gains in first and second electromagnetic receivers is computed. A ratio of selected ones of the measured voltages is processed in combination with the ratio of currents, the ratio of gains, and a test loop calibration coefficient to compute the calibrated directional electromagnetic logging measurement.

17 Claims, 5 Drawing Sheets

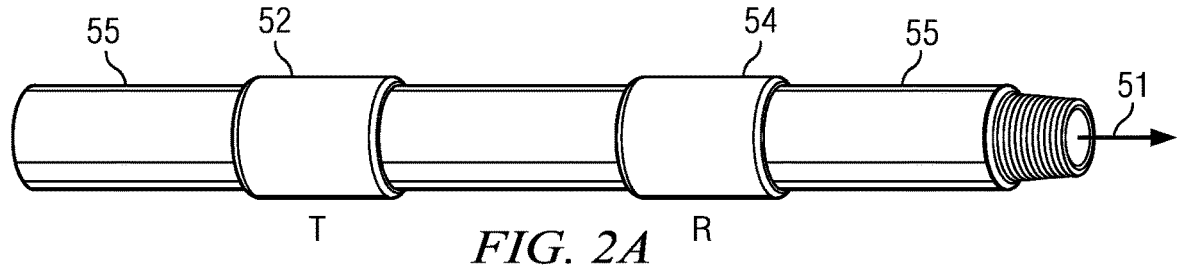
*FIG. 2A*
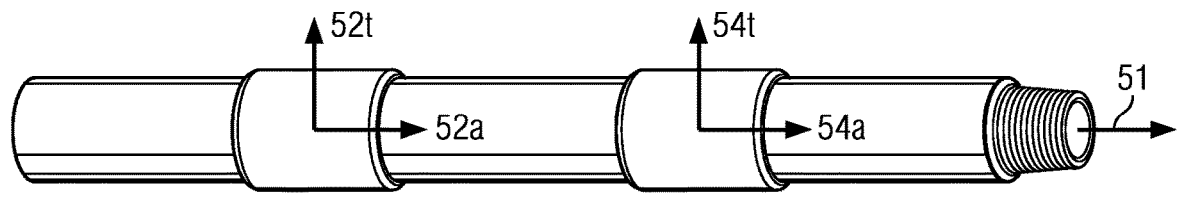
*FIG. 2B*
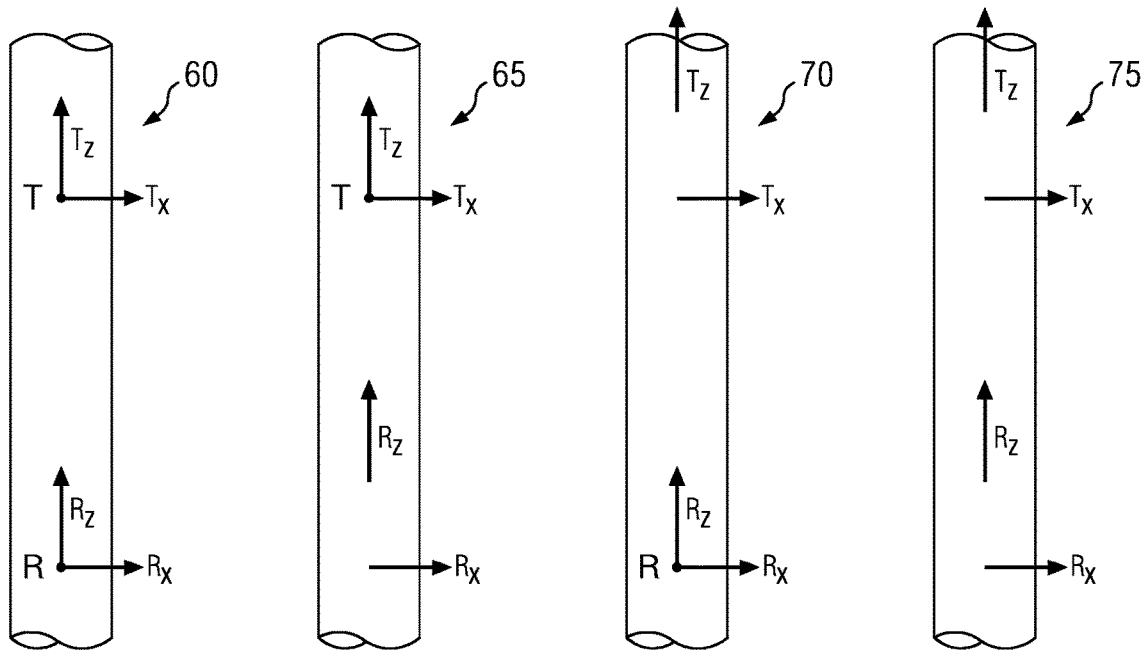
*FIG. 3A*   *FIG. 3B*   *FIG. 3C*   *FIG. 3D*

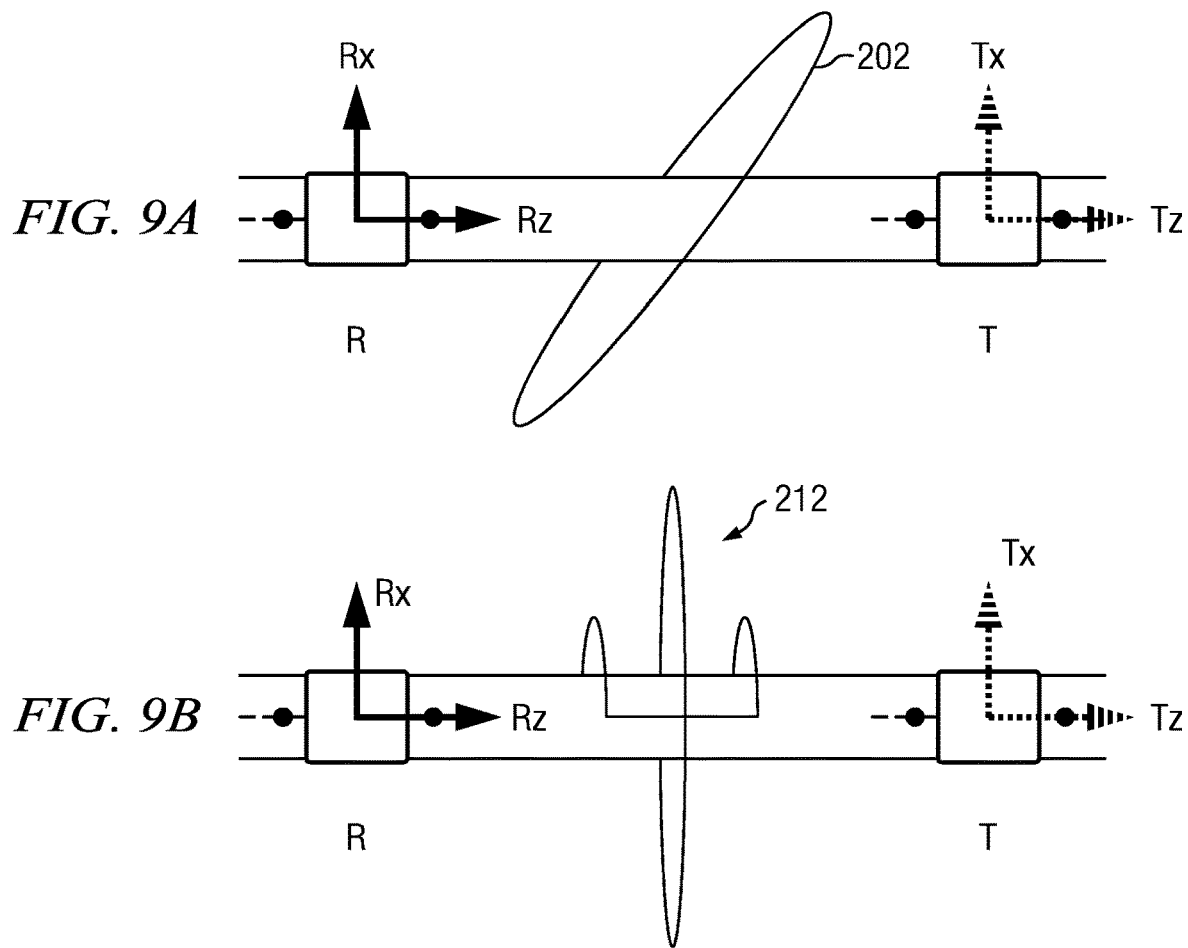
FIG. 9A
FIG. 9B
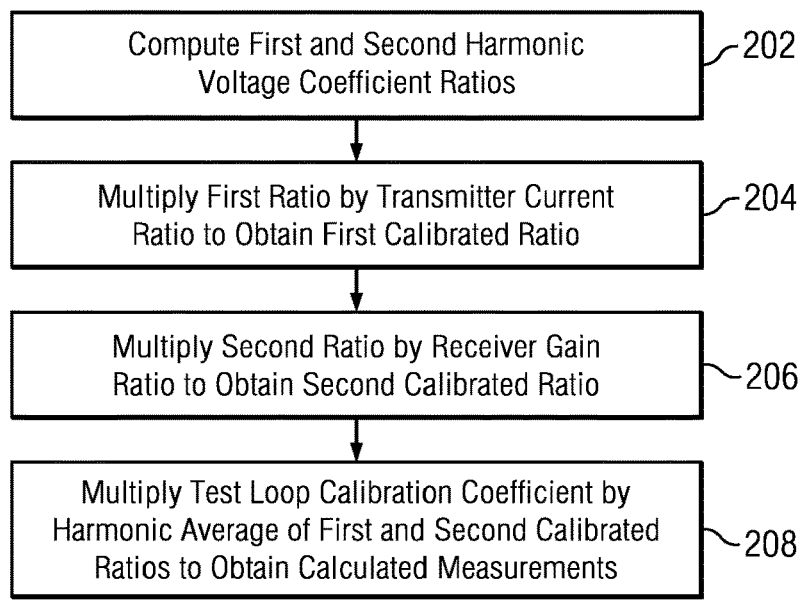
FIG. 10

DIRECTIONAL ELECTROMAGNETIC RATIO CALIBRATION

CROSS REFERENCE TO RELATED APPLICATIONS

None.

BACKGROUND

The use of electromagnetic measurements in prior art downhole applications, such as logging while drilling (LWD) and wireline logging applications is well known. Such logging techniques may be utilized to determine a subterranean formation resistivity, which, along with formation porosity measurements, is often used to indicate the presence of hydrocarbons in the formation. Moreover, azimuthally sensitive directional resistivity measurements are commonly employed, for example, in pay-zone steering applications, to provide information upon which steering decisions may be made.

One difficulty associated with making downhole electromagnetic measurements is that imperfections in tool construction and gain variations due to tool electronics can introduce significant measurement errors. Various gain calibration and gain compensation techniques are known for reducing and/or cancelling these gains. While such gain calibration and compensation techniques have been commercially employed, they are not always suitable for cross coupling measurements.

For example, conventional gain compensation techniques may introduce errors in near-homogeneous formations and can sometimes interfere with directional information. Known gain compensation techniques may further introduce phase ambiguity for certain combinations of formation anisotropy and dip. Therefore, there remains a need in the art for improved calibration and/or compensation techniques for directional resistivity logging tools, particularly for making cross coupling electromagnetic measurements.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 2A and 2B (collectively FIG. 2) depict one example of the electromagnetic logging tool shown on FIG. 1 including an electromagnetic transmitter and an electromagnetic receiver.

FIGS. 3A, 3B, 3C, and 3D (collectively FIG. 3) depict the antenna moments for various example transmitter and receiver configurations for obtaining gain compensated axial cross term quantities.

FIGS. 9A and 9B (collectively FIG. 9) depict another test loop configuration in which the tilted test loop of FIG. 7 (9A) or the series test loop of FIG. 8 (9B) is deployed passively about the tool collar and between collocated x- and z-axis receiver R antennas Rx and Rz and collocated x- and z-axis transmitter T antennas Tx and Tz.

FIG. 10 depicts a flow chart of one example method for making fully calibrated directional electromagnetic logging measurements.

DETAILED DESCRIPTION

A method for making a calibrated directional electromagnetic logging measurement is disclosed. An electromagnetic logging tool is deployed in a subterranean wellbore. The tool includes first and second electromagnetic transmitters and first and second electromagnetic receivers. A plurality of measurements are made while the tool is deployed in the subterranean wellbore. Each of the measurements includes a voltage measured at one of the electromagnetic receivers when one of the electromagnetic transmitters fires. A downhole calibration of the transmitters and receivers is performed that includes computing a ratio of currents in the first and second electromagnetic transmitters and a ratio of gains in the first and second electromagnetic receivers. A ratio of selected ones of the measured voltages is processed in combination with the ratio of currents, the ratio of gains, and a test loop calibration coefficient to compute the calibrated directional electromagnetic logging measurement.

In another embodiment a method for calibrating an electromagnetic logging tool includes deploying a test loop about an electromagnetic logging tool including a transmitter and a receiver. The test loop includes an axial coil electrically connected in series with a transverse coil. A calibration measurement is made using at least one of the transmitter and the receiver while the test loop is deployed about the electromagnetic logging tool.

Disclosed embodiments may advantageously enable improved calibration of electromagnetic logging tools. For example, the disclosed calibration method may provide an improved method for removing system gains and therefore may provide directional electromagnetic logging measurements having improved accuracy. Such improved accuracy may provide for better quality measurements useful, for example, for evaluating subterranean formation properties and improved well placement in payzone steering operations.

Moreover, the disclosed calibration methodology may be particularly well suited for use with biaxial and triaxial antenna configurations (e.g., transmitters and receivers including axial and transverse antennas). The disclosed calibration methodology may enable such configurations to provide superior measurement data as compared to electromagnetic logging tools including tilted antennas. Moreover, the disclosed methodology may be particularly well suited for making cross coupling directional electromagnetic measurements and may therefore provide for improved detection and evaluation of remote formation features.

Furthermore the disclosed embodiments may enable full gain calibration of axial, transverse, biaxial, and/or triaxial antenna electromagnetic measurements and may be advantageously conducted independent of a model of the transmitter and receiver coupling and variation in any test loop parameters that may affect coupling with the antennas.

Figure 1:
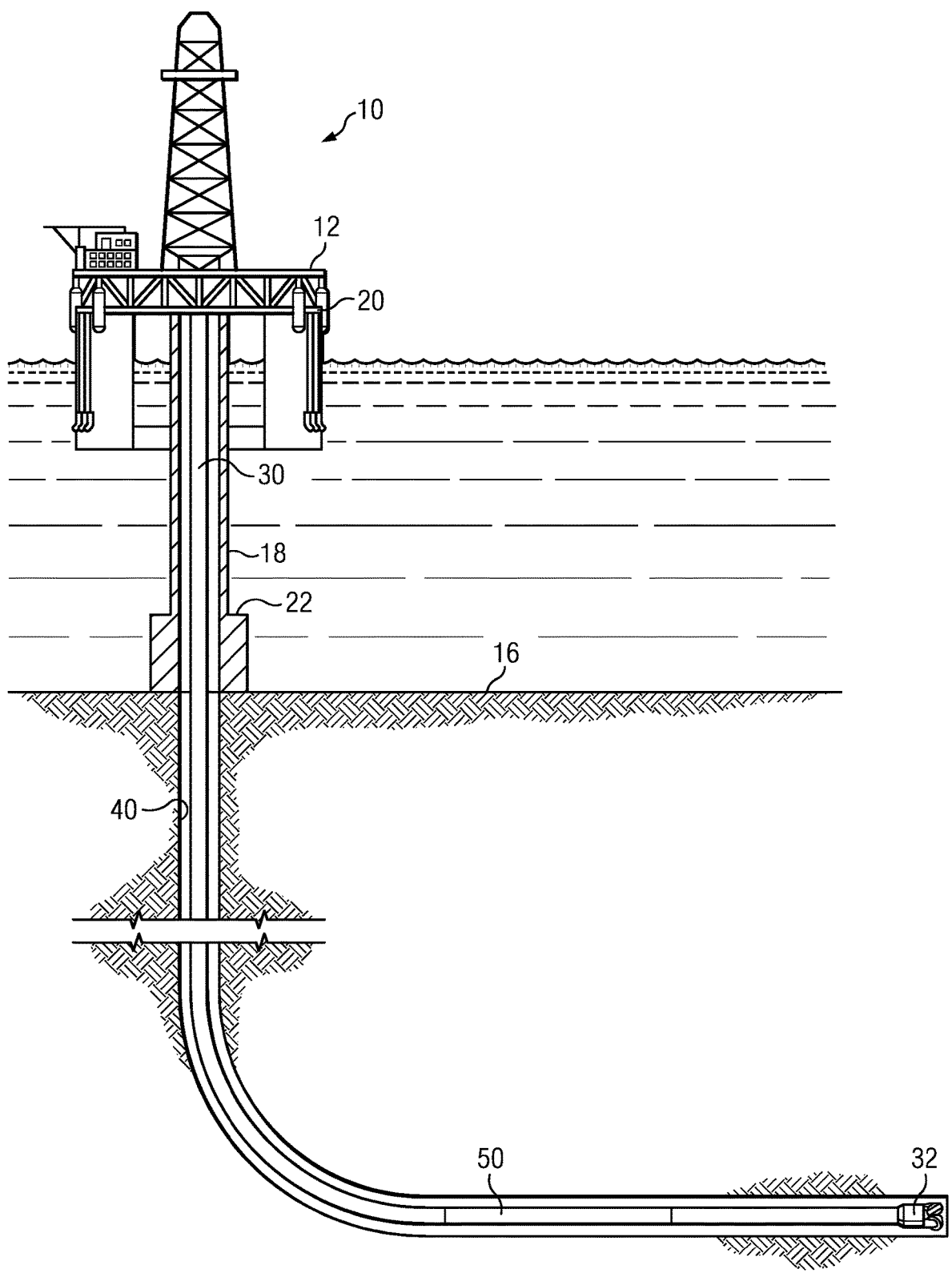
FIG. 1 depicts an example drilling rig including an electromagnetic logging tool.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA). The BHA further includes an electromagnetic logging tool 50 deployed above the drill bit 32 (e.g., above the bit and an optional steering tool).

It will be understood that the deployment illustrated on FIG. 1 is merely an example. Drill string 30 may include substantially any suitable downhole tool components, for example, including a steering tool such as a rotary steerable tool, a downhole telemetry system, and one or more additional MWD and/or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations. Moreover, disclosed embodiments are not limited to logging while drilling embodiments as illustrated on FIG. 1. The disclosed embodiments are equally well suited for use with any electromagnetic logging tool, including wireline logging tools and logging while drilling tools.

FIGS. 2A and 2B (collectively FIG. 2) depict one example embodiment of the electromagnetic measurement tool 50 shown on FIG. 1 (or a portion of the tool 50). In the depicted embodiment, the tool 50 includes an electromagnetic transmitter 52 and an electromagnetic receiver 54 deployed on a tool collar (or body) 55. As depicted, the transmitter 52 and receiver 54 are axially spaced apart on the tool collar 55. Those of ordinary skill will readily recognize that substantially any suitable transmitter and receiver spacing may be utilized to achieve a desired measurement depth of measurement. Moreover, it will be understood that in deep reading embodiments the transmitter 52 and receiver 54 may be deployed on distinct tool transmitter and receiver collars (or subs) that are spaced apart on the string (e.g., by 30, 50, or even 100 feet). In such embodiments, other downhole tools may be deployed between the distinct transmitter and receiver collars.

As described in more detail below the transmitter 52 and receiver 54 each include at least one axial antenna and at least one transverse antenna (e.g., in triaxial antenna embodiments each includes an axial antenna and first and second transverse antennas that are orthogonal to one another). As is known to those of ordinary skill in the art, an axial antenna is one whose moment $52a$, $54a$ is substantially parallel with the longitudinal axis 51 of the collar 55. Axial antennas are commonly wound about the circumference of the logging tool such that the plane of the antenna is substantially orthogonal to the tool axis 51. A transverse antenna is one whose moment $52t$, $54t$ is substantially perpendicular to the longitudinal axis of the tool. A transverse antenna may include, for example, a saddle coil (e.g., as disclosed in U.S. Patent Publications 2011/0074427, entitled Directional Resistivity Antenna Shield, which is incorporated by reference herein).

FIGS. 3A, 3B, 3C, and 3D (collectively FIG. 3) depict the antenna moments for various example transmitter and receiver configurations. FIG. 3A depicts an example tool embodiment 60 similar to tool embodiment 50 in FIG. 2 including a transmitter T axially spaced apart from a receiver R. The transmitter T includes collocated axial and transverse transmitting antennas having moments $T_z$, and $T_x$. The receiver R includes collocated axial and transverse receiving antennas having moments $R_z$ and $R_x$. Those of ordinary skill will readily appreciate that by collocated it is meant that the axial and transverse antennas are located at about the same axial position on the tool collar (e.g., as shown schematically).

FIG. 3B depicts another tool embodiment 65 that is similar to tool embodiment 60 in that it also includes a transmitter T having collocated axial and transverse transmitting antennas having moments $T_z$, and $T_x$. Tool embodiment 65 differs from tool embodiment 60 in that the axial and transverse receiving antennas $R_z$ and $R_x$ are not collocated but are axially spaced apart from one another on the tool body.

FIG. 3C depicts still another tool embodiment 70 that is similar to tool embodiment 60 in that it also includes a receiver R having collocated axial and transverse receiving antennas having moments $R_z$ and $R_x$. Tool embodiment 70 differs from tool embodiment 60 in that the axial and transverse transmitting antennas $T_z$, and $T_x$ are not collocated but are axially spaced apart from one another on the tool body.

FIG. 3D depicts yet another tool embodiment 75 including axial and transverse transmitting antennas $T_z$, and $T_x$ and axial and transverse receiving antennas $R_z$ and $R_x$. Tool embodiment 75 differs from tool embodiment 60 in that neither the transmitting antennas nor the receiving antennas are collocated, but are axially spaced apart on the tool body.

With continued reference to FIG. 3 it will be understood that one or more of the transmitters and/or receivers in tool embodiments 60, 65, 70, and 75 may optionally further include a second transverse antenna (either collocated or non-collocated) such that the transmitter and/or receiver includes a triaxial antenna arrangement having three antennas that are arranged to be mutually independent.

It will further be understood that by convention, the axial antennas are referred to herein as z antennas or z-axis antennas and that the transverse antennas are referred to herein as the x antennas or x-axis antennas. The disclosed embodiments are of course not limited by such conventional nomenclature. Moreover, transmitter receiver couplings are referred to as xx and zz direct couplings (an x transmitter coupled with an x receiver or a z transmitter coupled with a z receiver) or xz and zx cross couplings (an x transmitter coupled with a z receiver or a z transmitter coupled with an x receiver). It will be understood that a direct coupling refers to a coupling in which the moments of the transmitter and receiver are parallel while a cross coupling refers to a coupling in which the moments of the transmitter and receiver are non-parallel (e.g., orthogonal). In the above nomenclature, the first subscript generally refers to the transmitter antenna while the second subscript refers to the receiver antenna. Those of ordinary skill will readily appreciate and understand such nomenclature.

With continued reference to FIGS. 2 and 3, and according to the described embodiments below, the terms "transmitter" and "receiver" are used to describe different functions of an antenna, as if they were different types of antennas. It will be understood that this is only for illustration purposes. A transmitting antenna and a receiving antenna have the same physical characteristics, and one of ordinary skill in the art would appreciate that the principle of reciprocity applies and that a radiating element may be used as a transmitter at one time and as a receiver at another. Thus, any specific description of transmitters and receivers in a particular tool embodiment should be construed to include the complementary configuration, in which the "transmitters" and the "receivers" are switched. Furthermore, in this description, a "transmitter" or a "receiver" is used in a general sense and may include a single radiating element, two radiating elements, or three radiating elements.

Figure 4:
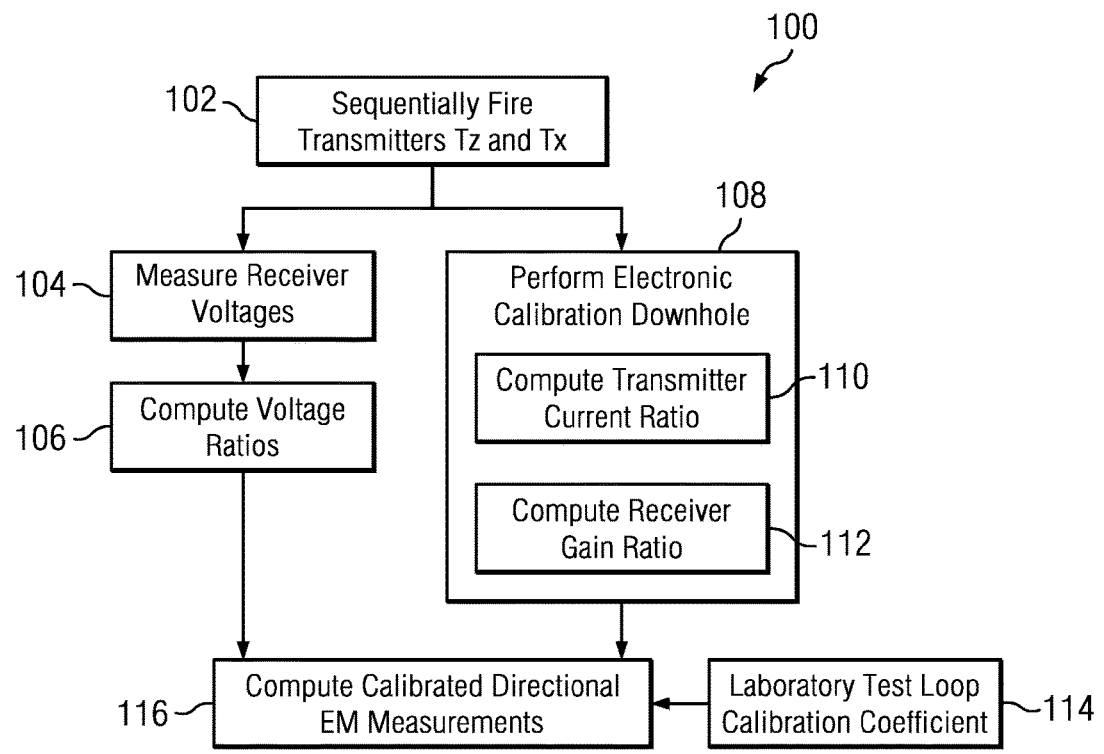
FIG. 4 depicts a flow chart of one disclosed method embodiment for obtaining gain calibrated electromagnetic measurements.

FIG. 4 depicts a flow chart of one example method embodiment 100 for obtaining calibrated electromagnetic measurements (e.g., while rotating). The use of electromagnetic measurements (e.g., propagation and induction measurements) is known in the downhole drilling arts. In such measurements, firing a transmitter to generate a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennas can be processed, as is known to those of ordinary skill in the art, to obtain one or more properties of the formation.

As depicted on FIG. 4, the electromagnetic measurements may be made while an electromagnetic logging tool (e.g., one of the tools described above with respect to FIGS. 2 and 3) is deployed in a subterranean wellbore (e.g., while drilling or during a wireline logging operation). It will be appreciated that the disclosed calibration methodology may be advantageously utilized while the tool is rotating or rotationally stationary (non-rotating) in the wellbore. The transmitters (transmitting antennas) are sequentially fired at 102. Corresponding receiver (receiving antenna) voltages are measured at 104. A selected ratio (or ratios) of the voltages are computed at 106. An electronic gain calibration is conducted at 108 (e.g., functionally parallel although not necessarily temporally parallel with measuring the receiver voltages at 104). Transmitter current and receiver gain ratios are computed at 110 and 112. The voltage ratio(s) obtained at 106, the transmitter current and receiver gain ratios computed at 110 and 112, and a test loop calibration coefficient previously obtained at 114 are processed in combination at 116 to compute calibrated electromagnetic logging measurements, for example, including directional tool symmetrized and anti-symmetrized measurements. The processing in 116 may be represented mathematically, for example, as follows:

$$M_{CAL} = K \cdot f\left(\frac{V_1}{V_2}, \frac{I_{T1}}{I_{T2}}, \frac{G_{R1}}{G_{R2}}\right) \quad (1)$$

where $M_{CAL}$ represents the calibrated electromagnetic logging measurement, $V_1/V_2$ represents the voltage ratio computed at 106, $I_{T1}/I_{T2}$ represents the transmitter current ratio computed at 110, $G_{R1}/G_{R2}$ represents the receiver gain ratio computed at 112, and $f(\cdot)$ indicates that the voltage ratio, the current ratio, and the gain ratio are processed in combination (i.e., that $M_{CAL}$ is a relation of and/or derived from the three listed ratios).

It will be appreciated that measurements made during tool rotation (e.g., while drilling) may include harmonic voltage measurements. These voltage harmonics may be obtained at 104, for example, via fitting the receiver voltage measurements to a function of the rotation angle θ (also referred to as a toolface angle) of the logging tool. In this way average (DC), first-harmonic cosine coefficient (FHC), first harmonic sine coefficient (FHS), second harmonic cosine coefficient (SHC), and second harmonic sine (SHS) coefficient may be obtained, for example, as follows:

$$V = V_{DC} + V_{FHC}\cos(\theta) + V_{FHS}\sin(\theta) + V_{SHC}\cos(2\theta) + V_{SHS}\sin(2\theta) \quad (2)$$

where V represents the measured voltage, $V_{DC}$ represents the DC coefficient, $V_{FHC}$ and $V_{FHS}$ represent the first harmonic cosine and first harmonic sine coefficients, and $V_{SHC}$ and $V_{SHS}$ represent the second harmonic cosine and second harmonic sine coefficients. These voltage harmonics may be considered to be the "measured" antenna voltages as they represent the antenna measurement input into the gain compensation processing described in more detail below. While the disclosed embodiments are described in more detail below with respect to measurements made while rotating, it will be appreciated that the disclosure is expressly not limited in this regard (as described above).

With continued reference to FIG. 4, various harmonic voltage ratios may be computed at 106. For example, certain ratios may be computed using the measured first harmonic cross coupling voltages $V_{xz\_fhc}$ and $V_{zx\_fhc}$ and the DC direct coupling voltages $V_{xx\_dc}$ and $V_{zz\_dc}$. These first harmonic cosine and DC voltages may be modeled, for example, as follows:

$$V_{zz\_dc} = g_{eRz\_dh} m_{Tz\_dh} m_{Rz\_dh} Z_{zz} I_{tz\_dh} \quad (3)$$

$$V_{zx\_fhc} = g_{eRx\_dh} m_{Tz\_dh} m_{Rx\_dh} Z_{zx} I_{tz\_dh} \quad (4)$$

$$V_{xx\_dc} = g_{eRx\_dh} m_{Tx\_dh} m_{Rx\_dh}\left(\frac{Z_{xx} + Z_{yy}}{2}\right) I_{tx\_dh} \quad (5)$$

$$V_{xz\_fhc} = g_{eRz\_dh} m_{Tx\_dh} m_{Rz\_dh} Z_{xz} I_{tx\_dh} \quad (6)$$

where $g_{eRz\_dh}$ and $g_{eRx\_dh}$ represent the electronic gains of the z-axis and x-axis receiver electronics downhole (e.g., at downhole temperature and pressure), $m_{Tz\_dh}$ and $m_{Tx\_dh}$ represent the effective areas of the z-axis and x-axis transmitter antennas downhole, $m_{Rz\_dh}$ and $m_{Rx\_dh}$ represent the effective areas of the z-axis and x-axis receiver antennas downhole, $I_{tz\_dh}$ and $I_{tx\_dh}$ represent currents in the z-axis and x-axis transmitter antennas, $Z_{xz}$ and $Z_{zx}$ represent the mutual cross coupling impedances, and $Z_{xx}$, $Z_{yy}$, and $Z_{zz}$ represent the mutual direct coupling impedances.

Given the above voltages, there are several options for computing ratios between the first and dc harmonics that involve ratios of the x to z transmitter effective areas and x to z transmitter currents or x to z receiver effective areas and x to z receiver electronics gains. For example, $$\frac{V_{zx\_fhc}}{V_{zz\_dc}} = \frac{g_{eRx\_dh} m_{Rx\_dh} Z_{xx}}{g_{eRz\_dh} m_{Rz\_dh} Z_{zz}} \quad (7)$$

$$\frac{V_{xz\_fhc}}{V_{zz\_dc}} = \frac{m_{Tx\_dh} I_{tx\_dh} Z_{xz}}{m_{Tz\_dh} I_{tz\_dh} Z_{zz}} \quad (8)$$

$$\frac{V_{zx\_fhc}}{V_{xx\_dc}} = \frac{m_{Tz\_dh} I_{tz\_dh}}{m_{Tx\_dh} I_{tx\_dh}} \frac{Z_{zx}}{\left(\frac{Z_{xx} + Z_{yy}}{2}\right)} \quad (9)$$

$$\frac{V_{xz\_fhc}}{V_{xx\_dc}} = \frac{g_{eRz\_dh} m_{Rz\_dh}}{g_{eRx\_dh} m_{Rx\_dh}} \frac{Z_{xz}}{\left(\frac{Z_{xx} + Z_{yy}}{2}\right)} \quad (10)$$

It is also possible to normalize the ratios to the geometric harmonic mean of the DC harmonics, for example, as follows:

$$\frac{V_{xz\_fhc}}{\sqrt{V_{zz\_dc} V_{xx\_dc}}} = \sqrt{\frac{m_{Rz\_dh}}{m_{Rx\_dh}}} \sqrt{\frac{m_{Tx\_dh}}{m_{Tz\_dh}}} \sqrt{\frac{I_{tx\_dh}}{I_{tz\_dh}}} \sqrt{\frac{g_{eRz\_dh}}{g_{eRx\_dh}}} \frac{Z_{xz}}{\sqrt{Z_{zz}\left(\frac{Z_{xx}+Z_{yy}}{2}\right)}} \quad (11)$$

$$\frac{V_{zx\_fhc}}{\sqrt{V_{zz\_dc} V_{xx\_dc}}} = \sqrt{\frac{m_{Rx\_dh}}{m_{Rz\_dh}}} \sqrt{\frac{m_{Tz\_dh}}{m_{Tx\_dh}}} \sqrt{\frac{I_{tz\_dh}}{I_{tx\_dh}}} \sqrt{\frac{g_{eRx\_dh}}{g_{eRz\_dh}}} \frac{Z_{zx}}{\sqrt{Z_{zz}\left(\frac{Z_{xx}+Z_{yy}}{2}\right)}} \quad (12)$$

Irrespective of which normalization is used, the ratio of the x to z effective areas, x to z transmitter currents, and x to z receiver electronics gains need to be determined and applied to the above measurements (ratios) to achieve calibrated measurements. The x to z transmitter currents and x to z receiver electronics gains may be obtained via electronic an calibration implemented in the tool's electronics circuitry and the x to z antenna gain ratios may be via an antenna calibration as described in more detail below.

Figure 5:
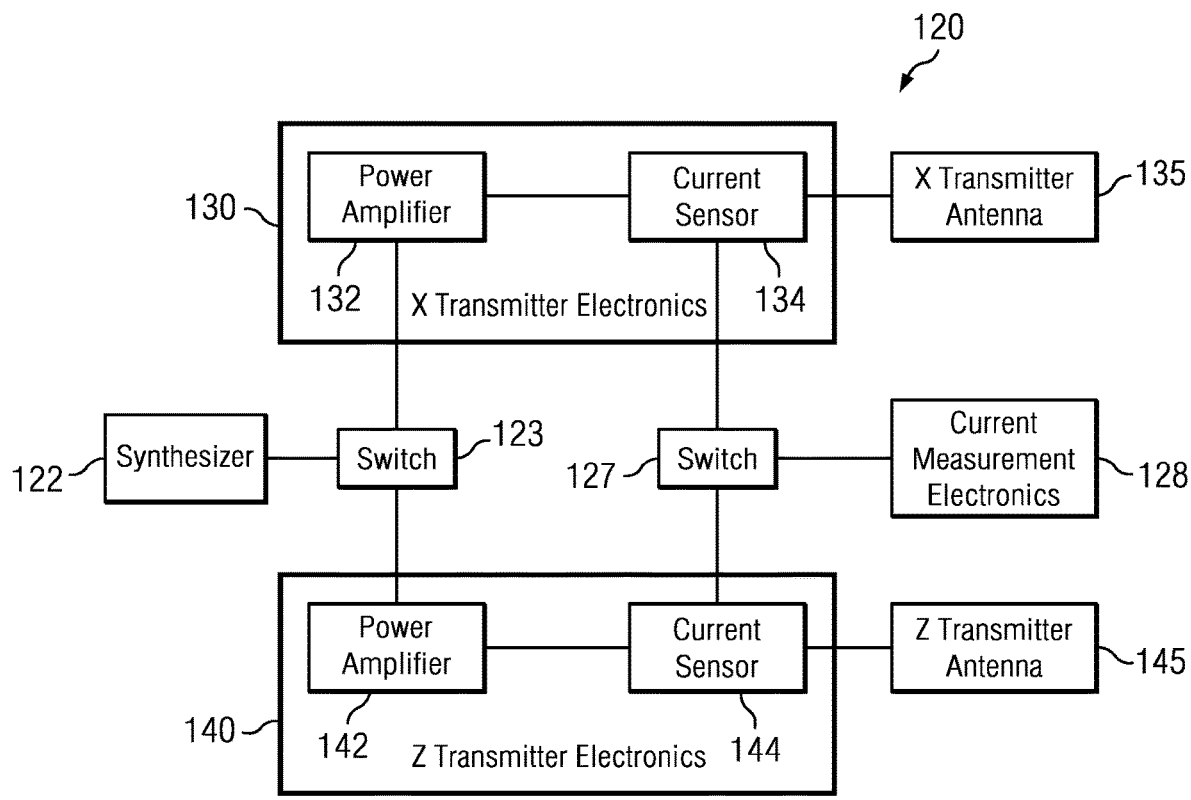
FIG. 5 depicts one example transmitter drive and current measurement circuit deployed in the electromagnetic logging tool and used to make electromagnetic measurements and perform a parallel electronic calibration.
Figure 6:
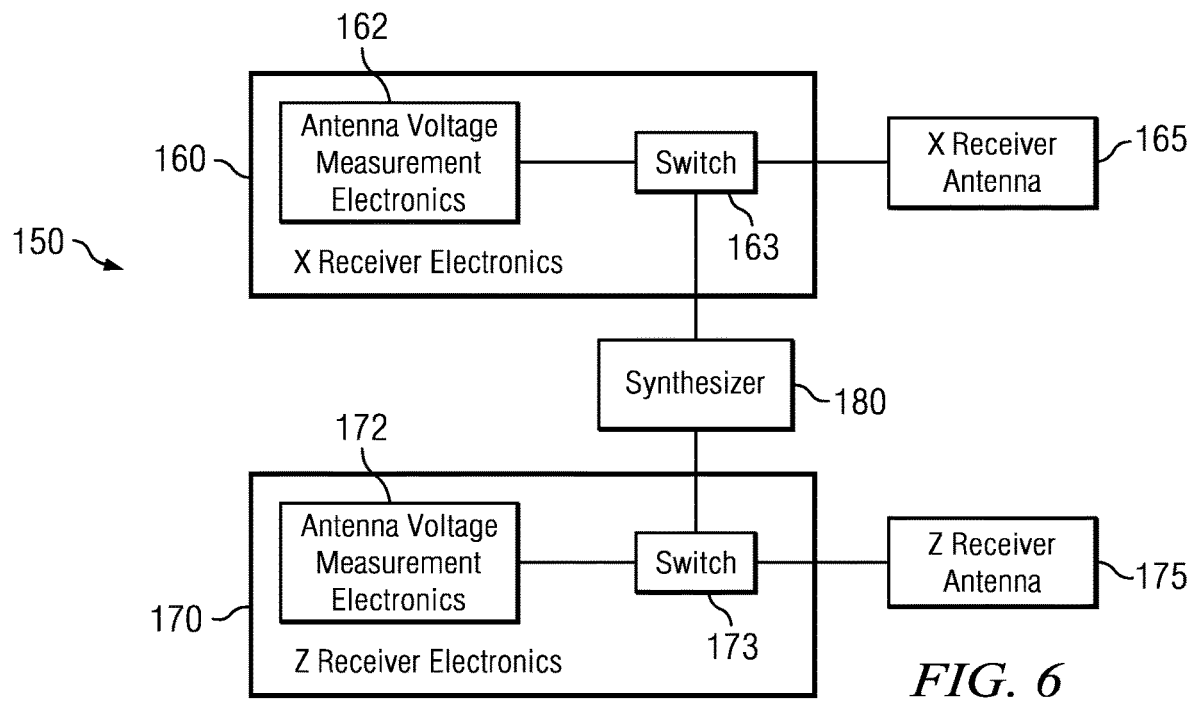
FIG. 6 depicts an example receiver antenna measurement and calibration circuit deployed in the electromagnetic logging tool and used to make electromagnetic measurements and perform a parallel electronic calibration.

Example electronic calibration processes suitable for use at 108 of method 100 (FIG. 4) are now described in more detail with respect to FIGS. 5 and 6 which depict an example transmitter drive and current measurement circuit 120 (FIG. 5) and an example receiver antenna measurement and calibration circuit 150 (FIG. 6). These example circuits may be deployed in the electromagnetic logging tool in electrical communication with the corresponding transmitter and receiving antennas as depicted.

In the transmitter circuit 120 of FIG. 5, a synthesizer 122 is connected to x- and z-axis transmitter electronics 130, 140 via a switch 123. The synthesizer 122 may configured to generate the AC waveform at selected transmission frequencies. The transmitter electronics 130, 140 include corresponding power amplifiers 132, 142 configured to amplify the synthesized waveform and current sensors 134, 144 in communication with the x- and z-axis transmitter antennas 135, 145. The current sensors 134, 144 are coupled to shared current measurement electronics 128 via switch 127. The switches 123, 127 are configured to switch back and forth between the x- and z-axis electronics 130, 140 and transmitter antennas 135, 145.

In FIG. 6, the receiver circuit 150 includes x- and z-axis receiver electronics 160, 170. The x- and z-axis antenna voltage measurement electronics 162, 172 are connected to the x- and z-axis antennas 165, 175 via corresponding switches 163, 173. A synthesizer 180 may also be connected to the voltage measurement electronics 162, 172 via the switches 163, 173. The synthesizer is configured to provide a reference calibration signal at the appropriate AC frequency. The switches 163, 173 are configured to switch back and forth between connecting the voltage measurement electronics 162, 172 with the antennas 165, 175 and the synthesizer 180.

Based on the example circuit depicted on FIG. 5, the transmitter current measurement may be modeled, for example, as follows:

$$V_{Icalx\_dh} = g_{elmeas\_dh} g_{Isensx\_dh} g_{Iimpx\_dh} I_{tx\_dh} \quad (13)$$

$$V_{Icalx\_dh} = g_{elmeas\_dh} g_{Isensz\_dh} g_{Iimpz\_dh} I_{tz\_dh} \quad (14)$$

where $V_{Icalx\_dh}$ and $V_{Icalz\_dh}$ represent voltage outputs measured by the current measurement electronics 128 (FIG. 5) that sense the corresponding currents in x- and z-axis antennas, $I_{tx\_dh}$ and $I_{tz\_dh}$ represent currents in the x- and z-axis antennas when the transmitters are fired, $g_{Isensx\_dh}$ and $g_{Isensz\_dh}$ represent the gains of the current sensors sensing the x-axis and z-axis transmitter currents a $g_{Iimpx\_dh}$ and $g_{Iimpz\_dh}$ represent the gains of the connection between the x- and z-axis current sensors and the measurement electronics, and $g_{elmeas\_dh}$ represents the gain of the electronics that measures the current sensor output voltages.

A transmitter current ratio may be computed at 112 (FIG. 4) via taking the ratios of these voltages, for example, as follows:

$$\frac{V_{Icalx\_dh}}{V_{Icalz\_dh}} = \frac{g_{Isensx\_dh} g_{Iimpx\_dh} I_{tx\_dh}}{g_{Isensz\_dh} g_{Iimpz\_dh} I_{tz\_dh}} \quad (15)$$

Equation 15 equals the ratio of the transmitter currents if the current sensor gains match and if gains associated with the connection between the current sensors and the measurement electronics (e.g., owing to different cable lengths) are matched (such that they cancel in Equation 15).

Based on the example circuit depicted on FIG. 6, the receiver voltage measurement may be modeled, for example, as follows:

$$V_{Rcalx\_dh} = g_{eRx\_dh} g_{Cal\_dh} g_{Cal\_Iimpx\_dh} V_{ref\_dh} \quad (16)$$

$$V_{Rcalz\_dh} = g_{eRz\_dh} g_{Cal\_dh} g_{Cal\_Iimpz\_dh} V_{ref\_dh} \quad (17)$$

where $V_{Rcalx\_dh}$ and $V_{Rcalz\_dh}$ represent receiver voltage measurements made by voltage measurement electronics 162, 172 when the synthesizer 180 fires (FIG. 6), $V_{ref\_dh}$ represents the synthesizer 180 reference voltage, gad dh represents the gain of the synthesizer calibration signal, $g_{Cal\_Iimpx\_dh}$ and $g_{Cal\_Iimpz\_dh}$, represent the effective gains of the signal paths between the synthesizer and the x- and z-axis receiver inputs, and $g_{eRx\_dh}$ and $g_{eRz\_dh}$ represent the downhole gains of the x- and z-axis receivers.

A receiver voltage ratio may be computed at 110 (FIG. 4) via taking the ratios of these voltages, for example, as follows:

$$\frac{V_{Rcalx\_dh}}{V_{Rcalz\_dh}} = \frac{g_{eRx\_dh} g_{Cal\_limpz\_dh}}{g_{eRz\_dh} g_{Cal\_limpz\_dh}} \quad (18)$$

Equation 18 equals the ratio of the receiver electronics gains if the effective signal path between the synthesizer and the measurement electronics are well matched.

Example test loop ratio calibration processes suitable for use at 114 of method 100 (FIG. 4) are now described in more detail with respect to FIGS. 7-9. The test loop calibration process is intended to determine antenna gain ratios that may be applied to the downhole measurements. Relative gains between the x- and z-axis antennas may be obtained using a test loop that couples both x- and z-axis antennas.

Figure 7A:
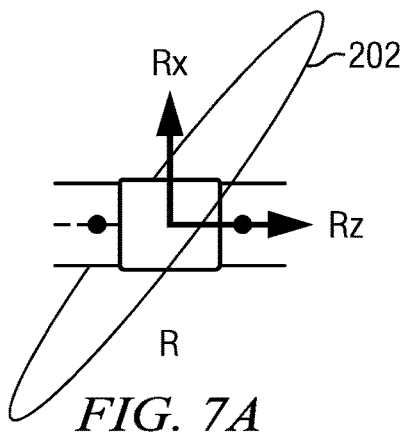
FIGS. 7A and 7B (collectively FIG. 7) depict a tilted test loop deployed about collocated x- and z-axis receiver R antennas Rx and Rz (7A) and about collocated x- and z-axis transmitter T antennas Tx and Tz (7B).
Figure 7B:
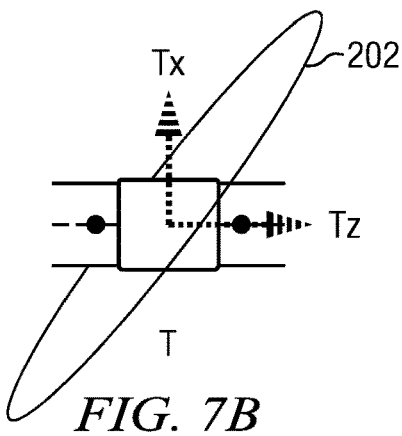

In one example embodiment, a tilted test loop (e.g., tilted by 45 degrees with respect to the tool axis) may be used as depicted on FIGS. 7A and 7B (collectively FIG. 7) in which a tilted test loop 202 is shown deployed about collocated x- and z-axis receiver R antennas Rx and Rz (7A) and about collocated x- and z-axis transmitter T antennas Tx and Tz (7B). When the tilted test loop 202 is deployed over the transmitter (7B), the voltage induced in the test loop 202 is measured when the X and Z transmitter antennas (coils) are fired in turn. When the test loop 202 is deployed over the receiver, the test loop may be fired (as a transmitter) and the voltages induced in the x- and z-axis antennas may be measured.

Figure 8A:
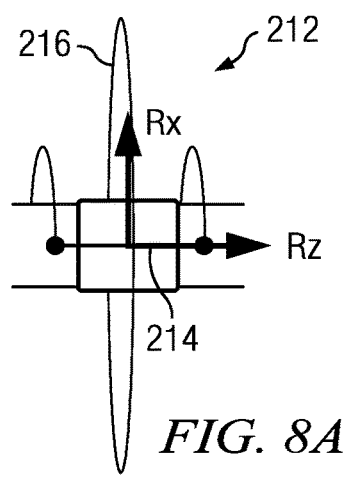
FIGS. 8A and 8B (collectively FIG. 8) depict another test loop geometry including axial and transverse antennas electrically connected in series and deployed about collocated x- and z-axis receiver R antennas Rx and Rz (8A) and about collocated x- and z-axis transmitter T antennas Tx and Tz (8B).
Figure 8B:
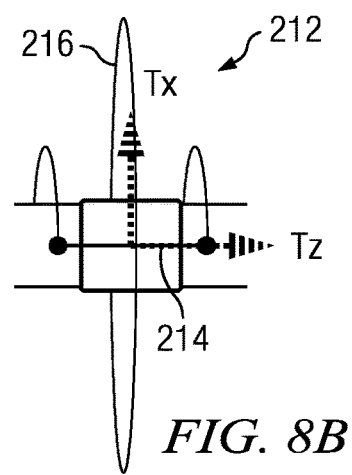

FIGS. 8A and 8B (collectively FIG. 8) depict another test loop geometry deployed about collocated x- and z-axis receiver R antennas Rx and Rz (8A) and about collocated x- and z-axis transmitter T antennas Tx and Tz (8B). The depicted test loop 212 includes x-axis (transverse) 214 and z-axis (axial) 216 coils electrically connected in series. In the depicted embodiment, the test loop 212 includes an axial coil 216 in series with a saddle coil 214. The coupling between these series coils and the x- and z-axis receiver and transmitter antennas may advantageously be less sensitive to variations in the orientation of the loop assembly compared to that of the tilted loop 202 (FIG. 7).

With continued reference to FIGS. 7 and 8, the coupling voltages between the test loop 202, 212 and the antennas may be modeled, for example, as follows:

$$V_{Lx} = g_{eRx\_tl} m_{Rx\_tl} Z_{LRx} I_{loop} \quad (19)$$

$$V_{xL} = g_{eCal} m_{Tx\_tl} Z_{TxL} I_{tx\_tl} \quad (20)$$

$$V_{Lz} = g_{eRz\_tl} m_{Rz\_tl} Z_{LRz} I_{loop} \quad (21)$$

$$V_{zL} = g_{eCal} m_{Tz\_tl} Z_{TzL} I_{tz\_tl} \quad (22)$$

where $V_{Lx}$ and $V_{Lz}$ represent the coupling voltages between the loop (L) and the x- and z-axis receiving antennas, $V_{xL}$ and $V_{zL}$ represent the coupling voltages between x- and z-axis transmitting antennas the loop (L), $g_{eRx\_tl}$ and $g_{eRz\_tl}$ represent the gains on the x- and z-axis receiver electronics during the test loop measurements, $g_{eCal}$ represents the gain of the electronics that measures the induced voltage in the calibration test loop, $m_{Rx\_tl}$ and $m_{Rz\_tl}$ represent the effective areas of the x- and z-axis receiver antennas from nominal during the test loop measurements, $m_{Tx\_tl}$ and $m_{Tz\_tl}$ represent the effective areas of the x- and z-axis receiver antennas from nominal during the test loop measurements, $Z_{LRx}$, $Z_{TxL}$, $Z_{LRz}$, and $Z_{TzL}$ represent the mutual impedances between the x- and z-axis transmitters and receivers and the test loop, and $I_{tx\_tl}$, $I_{tz\_tl}$, and $I_{loop}$ represent the currents in the x- and z-axis transmitters and the test loop.

A composite ratio may be computed from the test loop measurements, for example, as follows:

$$\frac{V_{Lx}}{V_{Lz}} \frac{V_{zL}}{V_{xL}} = \frac{g_{eRx\_tl} m_{Rx\_tl} m_{Tz\_tl} I_{tz\_tl}}{g_{eRz\_tl} m_{Rz\_tl} m_{Tx\_tl} I_{tx\_tl}} \left( \frac{Z_{LRx} Z_{TzL}}{Z_{LRz} Z_{TxL}} \right) \quad (23)$$

In commonly used electromagnetic logging tools, the geometries of the transmitting and receiver antennas are similar such that the coupling between the transmitter and receiver antennas is approximately symmetric. Even if the geometries of the transmitting and receiver antennas differ, the couplings may be approximately symmetric if the test loop is sufficiently large such that any differences in the geometry between transmitter and receiver antennas are small. By symmetric it is meant that $Z_{LRx} \approx Z_{TxL}$ and $Z_{TzL} \approx Z_{LRz}$ such that $$\left( \frac{Z_{LRx} Z_{TzL}}{Z_{LRz} Z_{TxL}} \right) = 1 + \delta \approx 1$$

Equation 23 then reduces to the following:

$$\frac{V_{Lx}}{V_{Lz}} \frac{V_{zL}}{V_{xL}} \approx \frac{g_{eRx\_tl} m_{Rx\_tl} m_{Tz\_tl} I_{tz\_tl}}{g_{eRz\_tl} m_{Rz\_tl} m_{Tx\_tl} I_{tx\_tl}} \quad (24)$$

The disclosed embodiments are, of course, not limited in this regard as the $\delta$ term above may be determined from precise measurements of the transmitter and receiver geometries.

Electronic gain ratios for the circuitry used to make the test loop voltage and current measurements may be determined as described above with respect to FIGS. 5 and 6 and Equations 13-18. A transmitter current ratio may be computed, for example as follows:

$$\frac{V_{Icalx\_tl}}{V_{Icalz\_tl}} = \frac{g_{Isensx\_tl} g_{Iimpx\_tl} I_{tx\_tl}}{g_{Isensz\_tl} g_{Iimpz\_tl} I_{tz\_tl}} \quad (25)$$

where $V_{Icalx\_tl}$ and $V_{Icalz\_tl}$ represent the voltage measurements corresponding to the currents in x- and z-axis antennas when coupled with the test loop, $I_{tx\_xl}$ and $I_{tz\_tl}$ represent currents in the x- and z-axis antennas when the transmitters are fired, $g_{Isensx\_tl}$ and $g_{Isensx\_tl}$ represent the gains of the current sensors sensing the x-axis and z-axis transmitter currents, and $g_{Iimpx\_tl}$ and $g_{Iimpz\_tl}$ represent the gains of the connection between the x- and z-axis current sensors and the measurement electronics.

A receiver electronic calibration gain ratio may be computed, for example, as follows:

$$\frac{V_{Rcalx\_tl}}{V_{Rcalz\_tl}} = \frac{g_{eRx\_tl} g_{Cal\_limpx\_tl}}{g_{eRz\_tl} g_{Cal\_limpz\_tl}} \quad (26)$$

where $V_{Rcalx\_tl}$ and $V_{Rcalz\_tl}$ represent the receiver voltage measurements when the test loop is fired, $g_{Cal\_Iimpx\_tl}$ and $g_{Cal\_Iimpz\_tl}$ represent the effective gains of the signal paths between a synthesizer and the x- and z-axis receiver inputs, and $g_{eRx\_tl}$ and $g_{eRz\_tl}$ represent the gains of the x- and z-axis receivers in the laboratory (or at whatever location the test loop measurements are made).

Applying the ratios to the composite ratio given above in Equation 23 (or 24), yields a composite ratio of the affective areas (at the temperature and pressure where the test loop calibration measurements are performed) of the transmitter and receiver antennas, for example, as follows:

$$K_{rxz\_tzx} \overset{def}{=} \sqrt{\frac{V_{Lx}}{V_{Lz}} \frac{V_{zL}}{V_{xL}}} \sqrt{\frac{V_{Icalx\_tl}}{V_{Icalz\_tl}} \frac{V_{Rcalz\_tl}}{V_{Rcalx\_tl}}} = \sqrt{\frac{m_{Rx\_tl} m_{Tz\_tl}}{m_{Rz\_tl} m_{Tx\_tl}}} \quad (27)$$

where $K_{rxz\_tzx}$ represents the test loop calibration coefficient.

FIGS. 9A and 9B (collectively FIG. 9) depict another test loop configuration for obtaining the test loop calibration coefficient. Relative gains between the x- and z-axis antennas may be determined by using a passive test loop. FIG. 9A depicts a passive tilted test loop 202 deployed about the tool collar between collocated x- and z-axis receiver R antennas Rx and Rz and collocated x- and z-axis transmitter T antennas Tx and Tz. FIG. 9B depicts a test loop 212 including x-axis and z-axis coils electrically connected in series deployed about the tool collar between collocated x- and z-axis receiver R antennas Rx and Rz and collocated x- and z-axis transmitter T antennas Tx and Tz. In the depicted embodiment, the test loop 212 includes an axial coil 216 in series with a saddle coil 214 (FIG. 8). Using either arrangement, the x- and z-axis transmitters are fired sequentially inducing voltages and corresponding currents in the test loop which in turn induces voltages in the receiver antennas. The voltages in the receiver antennas may be expressed mathematically, for example, as follows:

$$V_{tzLRx} = g_{eRx\_tl} m_{Tz\_tl} m_{Rx\_tl} I_{tz\_tl} \frac{Z_{LRx} Z_{TzL}}{Z_{loop}} \quad (28)$$

$$V_{txLRz} = g_{eRz\_tl} m_{Tx\_tl} m_{Rz\_tl} I_{tx\_tl} \frac{Z_{LRz} Z_{TxL}}{Z_{loop}} \quad (29)$$

where $V_{txLRz}$ and $V_{tzLRx}$ represent the induced voltages in the x- and z-axis receivers when the z- and x-axis transmitters are fired. Taking a ratio of these voltages yields the following:

$$\frac{V_{tzLRx}}{V_{txLRz}} = \frac{g_{eRx\_tl} m_{Rx\_tl} m_{Tz\_tl} I_{tz\_tl}}{g_{eRz\_tl} m_{Rz\_tl} m_{Tx\_tl} I_{tx\_tl}} \left( \frac{Z_{LRx} Z_{TzL}}{Z_{LRz} Z_{TxL}} \right) \quad (30)$$

As described above with respect to Equations 23-27, combining the ratio in Equation 30 with electronic gain ratios for the circuitry used to make the test loop voltage and current measurements (Equations 25 and 26), yields an similar test loop calibration coefficient $$K_{rxz\_tzx} \overset{def}{=} \sqrt{\frac{V_{tzLRx}}{V_{txLRz}}} \sqrt{\frac{V_{Icalx\_tl}}{V_{Icalz\_tl}} \frac{V_{Rcalz\_tl}}{V_{Rcalx\_tl}}} = \sqrt{\frac{m_{Rx\_tl} m_{Tz\_tl}}{m_{Rz\_tl} m_{Tx\_tl}}} \quad (31)$$

Based on the foregoing, fully calibrated directional electromagnetic logging measurements may be obtained, for example, as depicted in FIG. 10. In the depicted embodiment, first and second ratios of selected voltage measurements may be computed at 202. The first ratio may be multiplied at 204 by the ratio of transmitter currents to obtain a first calibrated ratio (e.g., as described above with respect to Equations 13-15). The second ratio may be multiplied at 206 by the ratio of the receiver gains to obtain a second calibrated ratio (e.g., as described above with respect to Equations 16-18). The test loop calibration coefficient may then be multiplied at 208 by a product or a harmonic average of the first calibrated ratio and the second calibrated ratio to obtain the calibrated directional electromagnetic logging measurements. Example embodiments are now described in more detail by way of the following equations.

Using the electronic calibrations described previously with respect to 110 and 112 of FIG. 4 (and in Equations 15 and 18), electronically calibrated measurement ratios (the first and second calibrated ratios in FIG. 10) may be obtained, for example, as follows:

$$V_{xz\_zz\_ecal} \overset{def}{=} \frac{V_{xz\_fhc}}{V_{zz\_dc}} \frac{1}{V_{Icalxz\_dh}} = \frac{m_{Tx\_dh} Z_{xz}}{m_{Tz\_dh} Z_{zz}} \quad (32)$$

$$V_{xz\_xx\_ecal} \overset{def}{=} \frac{V_{xz\_fhc}}{V_{xx\_dc}} V_{Rcalxz\_dh} = \frac{m_{Rz\_dh}}{m_{Rx\_dh}} \frac{Z_{xz}}{\left(\frac{Z_{xx} + Z_{yy}}{2}\right)} \quad (33)$$

where $V_{xz\_zz\_ecal}$ and $V_{xz\_xx\_ecal}$ represent the electronically calibrated measurement ratios and $V_{Icalxz\_dh}$ and $V_{Rcalxz\_dh}$ represent the transmitter current ratio and the receiver voltage ratio given above in Equations 15 and 18.

Combining these electronically calibrated measurement ratios yields the following:

$$XZ \overset{def}{=} K_{rxz\_tzx} \cdot \sqrt{(V_{xz\_zz\_ecal})(-V_{xz\_xx\_ecal})} = \quad (34)$$

$$\frac{Z_{xz}}{\sqrt{Z_{zz}} \sqrt{-\left(\frac{Z_{xx} + Z_{yy}}{2}\right)}} \sqrt{\frac{m_{Rz\_dh}}{m_{Rx\_dh}} \frac{m_{Rx\_tl}}{m_{Rz\_tl}}} \sqrt{\frac{m_{Tx\_dh}}{m_{Tz\_dh}} \frac{m_{Tz\_tl}}{m_{Tx\_tl}}}$$

where XZ represents the fully calibrated xz measurement and $\sqrt{(V_{xz\_zz\_ecal})(-V_{xz\_xx\_ecal})}$ represents a harmonic average of the electronically calibrated measurement ratios given in Equations 32 and 33. The negative sign is used in $(-V_{xz\_xx\_ecal})$ to rotate the phase to be closer to $(V_{xz\_zz\_ecal})$ so that the sharp angle between the quantities can be taken when taking the complex square root (since at high resistivity the xx coupling has the opposite sign of the zz coupling).

When the transmitter and receiver antennas are constructed having similar dimensions on the same collar (as in commonly constructed electromagnetic LWD tools) then the ratio of the transmitter and receiver effective areas do not vary relative to each other with changes in temperature and pressure. Therefore:

$$\sqrt{\frac{m_{Rz\_dh}}{m_{Rx\_dh}}\frac{m_{Rx\_tl}}{m_{Rz\_tl}}}\sqrt{\frac{m_{Tx\_dh}}{m_{Tz\_dh}}\frac{m_{Tz\_tl}}{m_{Tx\_tl}}} = \sqrt{\frac{m_{Rz\_dh}}{m_{Tz\_dh}}\frac{m_{Tz\_tl}}{m_{Rz\_tl}}}\sqrt{\frac{m_{Tx\_dh}}{m_{Rx\_dh}}\frac{m_{Rx\_tl}}{m_{Tx\_tl}}} \quad (35)$$

with $$\sqrt{\frac{m_{Rz\_dh}}{m_{Tz\_dh}}\frac{m_{Tz\_tl}}{m_{Rz\_tl}}} = 1+\delta \approx 1$$

and $$\sqrt{\frac{m_{Tx\_dh}}{m_{Rx\_dh}}\frac{m_{Rx\_tl}}{m_{Tx\_tl}}} = 1+\delta \approx 1$$

It will be appreciated that it may be desirable in certain embodiments (or logging operations) (e.g., when increased calibration accuracy is desired) to determine to more precisely determine the quantity δ via measuring exact transmitter and receiver antenna geometries.

The fully calibrated xz measurement XZ may be defined as follows:

$$XZ \stackrel{def}{=} K_{rxz\_tzx}\sqrt{(V_{xz\_zz\_ecal})(-V_{xz\_xx\_ecal})} = \frac{Z_{xz}}{\sqrt{Z_{zz}}\sqrt{-\left(\frac{Z_{xx}+Z_{yy}}{2}\right)}} \quad (36)$$

Following a similar procedure, the zx measurement, electronically calibrated measurement ratios may be obtained, for example, as follows:

$$V_{zx\_zz\_ecal} \stackrel{def}{=} \frac{V_{zx\_fhc}}{V_{zz\_dc}}\frac{1}{V_{Rcalxz\_dh}} = \frac{m_{Rx\_dh}Z_{zx}}{m_{Rz\_dh}Z_{zz}} \quad (37)$$

$$V_{zx\_xx\_ecal} \stackrel{def}{=} \frac{V_{zx\_fhc}}{V_{xx\_dc}}V_{Icalxz\_dh} = \frac{m_{Tz\_dh}}{m_{Tx\_dh}}\frac{Z_{zx}}{\left(\frac{Z_{xx}+Z_{yy}}{2}\right)} \quad (38)$$

where $V_{zx\_zz\_ecal}$ and $V_{zx\_xx\_ecal}$ represent the electronically calibrated measurement ratios and $V_{Icalxz\_dh}$ and $V_{Rcalxz\_dh}$ represent the transmitter current ratio and the receiver voltage ratio given above in Equations 15 and 18. The fully calibrated zx measurement ZX may then be defined as follows:

$$ZX \stackrel{def}{=} \frac{1}{K_{rxz\_tzx}}\sqrt{(V_{zx\_zz\_ecal})(-V_{zx\_xx\_ecal})} = \frac{Z_{zx}}{\sqrt{Z_{zz}}\sqrt{-\left(\frac{Z_{xx}+Z_{yy}}{2}\right)}} \quad (39)$$

In an another embodiment, calibration of the xz and zx measurements may make use of an air hang calibration in which the tool is lifted high enough away from conductive materials such that the transmitter receiver coupling is not influenced. The voltages measured in such an air hang calibration may be modeled, for example, as follows:

$$V_{xx\_air} = g_{eRx\_air}m_{Tx\_air}m_{Rx\_air}Z_{xx\_air}I_{tx\_air} \quad (40)$$

$$V_{zz\_air} = g_{eRz\_air}m_{Tz\_air}m_{Rz\_air}Z_{zz\_air}I_{tz\_air} \quad (41)$$

where $V_{xx\_air}$ and $V_{zz\_air}$ represent xx and zz air hang voltages (measured between the x-axis transmitter and receiver and the z-axis transmitter and receiver), $g_{eRx\_air}$ and $g_{eRz\_air}$ represent the electronic gains of the x- and z-axis receivers, $m_{Tx\_air}$, $m_{Rx\_air}$, $m_{Tz\_air}$, and $m_{Rz\_air}$ represent effective areas of the z-axis and x-axis transmitter and receiver antennas, $Z_{xx\_air}$ and $Z_{zz\_air}$ represent the xx and zz coupling impedances in air, and $I_{tx\_air}$ and $I_{tz\_air}$ represent the x- and z-axis transmitter currents.

To normalize the zz coupling, the calibration coefficients for the transmitter Ktzx and receiver Krzx may be defined, for example, as follows:

$$Ktzx \stackrel{def}{=} K_{rxz\_tzx}\sqrt{\frac{V_{zz\_air}}{-V_{xx\_air}}V_{Rcal\_xz\_air}I_{cal\_xz\_air}} \quad (42)$$

$$Krzx \stackrel{def}{=} \frac{1}{K_{rxz\_tzx}}\sqrt{\frac{V_{zz\_air}}{-V_{xx\_air}}V_{Rcal\_xz\_air}I_{cal\_xz\_air}} \quad (43)$$

where $V_{Rcal\_xz\_air}$ and $I_{cal\_xz\_air}$ represent an electronic gain ratio and a transmitter current ratio determined as described above with respect to FIGS. 5 and 6 and Equations 13-18 during the air hang test.

The xz and zx measurements XZ and ZX with the above defined zz normalization may be then be defined, for example, as follows:

$$XZ = Ktzx \cdot V_{xz\_zz\_ecal} = \sqrt{\frac{Z_{zz\_air}}{-Z_{xx\_air}}\frac{Z_{xz}}{Z_{zz}}} \quad (44)$$

$$ZX = Krzx \cdot V_{zx\_zz\_ecal} = \sqrt{\frac{Z_{zz\_air}}{-Z_{xx\_air}}\frac{Z_{zx}}{Z_{zz}}} \quad (45)$$

The xz and zx measurements XZ and ZX may also be defined with a xx+yy normalization, for example, as follows:

$$XZ = \frac{1}{Krzx}V_{xz\_xx\_ecal} = \sqrt{\frac{-Z_{zz\_air}}{Z_{xx\_air}}\frac{Z_{xz}}{\left(\frac{Z_{xx}+Z_{yy}}{2}\right)}} \quad (46)$$

$$ZX = \frac{1}{Ktzx}V_{zx\_xx\_ecal} = \sqrt{\frac{-Z_{xx\_air}}{Z_{xx\_air}}\frac{Z_{zx}}{\left(\frac{Z_{xx}+Z_{yy}}{2}\right)}} \quad (47)$$

The compensated electromagnetic measurements described above may be processed (e.g., via inversion modeling) to determine various electromagnetic and physical properties of a subterranean formation. These properties may be further evaluated to guide (steer) subsequent drilling of the wellbore, for example, during a pay-zone steering operation in which it is desirable to maintain the wellbore within a particular formation layer (i.e., the pay-zone).

It will be understood that the various steps in the disclosed calibration methodology may be implemented on a on a downhole processor (controller). By downhole processor it is meant an electronic processor (e.g., a microprocessor or digital controller) deployed in the drill string (e.g., in the electromagnetic logging tool or elsewhere in the BHA). In such embodiments, the above described calibration coefficients and calibration factors may be stored in downhole memory and may then be applied to the electromagnetic measurements to compute calibrated measurements. Such calibrated measurements may also be stored in downhole memory and/or transmitted to the surface while drilling via known telemetry techniques (e.g., mud pulse telemetry or wired drill pipe). Whether stored in memory or transmitted to the surface, the calibrated electromagnetic measurements may be utilized in an inversion process (along with a formation model) to obtain various parameters of the subterranean formation. The calibrated measurements may also be used in a geosteering operation to guide subsequent drilling of the wellbore.

It will be understood that the present disclosure includes numerous embodiments. These embodiments include, but are not limited to, the following embodiments.

In a first embodiment, a method for making a calibrated directional electromagnetic logging measurement includes deploying a tool in a subterranean wellbore, the tool including first and second electromagnetic transmitters and first and second electromagnetic receivers; causing the tool to make a plurality of measurements while deployed in the subterranean wellbore, each of the measurements including a voltage measured at one of the electromagnetic receivers when one of the electromagnetic transmitters fires; performing a downhole calibration of the electromagnetic transmitters and the electromagnetic receivers, the downhole calibration including computing a ratio of currents in the first and second electromagnetic transmitters and a ratio of gains in the first and second electromagnetic receivers; and processing a ratio of selected ones of the measured voltages in combination with the ratio of currents, the ratio of gains, and a test loop calibration coefficient to compute the calibrated directional electromagnetic logging measurements.

A second embodiment includes the first embodiment and further comprises inverting the calibrated directional electromagnetic logging measurements to determine at least one property of the subterranean formation.

A third embodiment includes the second first embodiment and further comprises changing a direction of drilling in response to the at least one property of the subterranean formation.

A fourth embodiment includes any one of the first through third embodiments, wherein: deploying the tool comprises rotating the tool in the subterranean wellbore; each of the plurality of measurements comprises a plurality of harmonic voltage coefficients; and the processing a ratio comprises processing a ratio of selected ones of the harmonic voltage coefficients.

A fifth embodiment includes any one of the first through fourth embodiments, wherein the tool comprises at least one axial transmitter, at least one transverse transmitter, at least one axial receiver, and at least one transverse receiver; and causing the tool to make a plurality of measurements comprises: causing the axial transmitter and the transverse transmitter to sequentially fire while rotating the tool in the subterranean wellbore; causing the axial receiver and the transverse receiver to measure corresponding voltages for each of the transmitter firings; and processing the voltages measured by the axial receiver and the transverse receiver to compute the corresponding harmonic voltage coefficients.

A sixth embodiment includes any one of the first through fifth embodiments, wherein the ratio of currents comprises a ratio of a current in a transverse transmitter to a current in an axial transmitter; and the ratio of gains comprises a ratio of a voltage measured in measurement electronics in a transverse receiver to a voltage measured in measurement electronics in an axial receiver when a synthesizer is fired.

A seventh embodiment includes any one of the first through sixth embodiments, wherein the test loop calibration coefficient is a product of a composite test loop ratio, a transmitter current ratio in a test loop measurement, and a receiver gain ratio in the test loop measurement.

An eighth embodiment includes the seventh embodiment, wherein the composite test loop ratio comprises a product of first and second ratios, the first ratio being a ratio of voltages in a transverse receiver and an axial receiver when a test loop fires and the second ratio being a ratio of voltages in the test loop when an axial transmitter fires and a transverse transmitter fires.

A ninth embodiment includes any one of the first through eighth embodiments, wherein the performing a downhole calibration and the processing a ratio comprise in combination: computing a first ratio and a second ratio of selected harmonic voltage coefficients; multiplying the first ratio by the ratio of currents to obtain a first calibrated ratio; multiplying the second ratio by the ratio of gains to obtain a second calibrated ratio; and multiplying the test loop calibration coefficient by a harmonic average of the first calibrated ratio and the second calibrated ratio to obtain the calibrated directional electromagnetic logging measurements.

A tenth embodiment includes any one of the first through ninth embodiments, wherein the ratio of selected ones of the voltages comprises a ratio of a first harmonic voltage coefficient to a DC voltage coefficient.

An eleventh embodiment includes the tenth embodiment, wherein the first harmonic voltage coefficient comprises a first harmonic sine voltage coefficient.

A twelfth embodiment includes the tenth embodiment, wherein the first harmonic voltage coefficient is a cross coupling voltage coefficient and the DC voltage coefficient is a direct coupling voltage coefficient.

In a thirteenth embodiment an electromagnetic logging tool includes a logging tool body; first and second transmitters deployed on the tool body; first and second receivers deployed on the tool body and spaced apart from the first and second transmitters; and a processor configured to: cause the transmitters and the receivers to make a plurality of measurements while the electromagnetic logging tool is deployed in a subterranean wellbore, each of the measurements including a voltage measured at one of the receivers when one of the transmitters fires; perform a downhole calibration of the transmitters and the receivers, the downhole calibration including computing a ratio of currents in the first and second transmitters and a ratio of gains in the first and second receivers; and process a ratio of selected ones of the measured voltages in combination with the ratio of currents, the ratio of gains, and a test loop calibration coefficient stored in memory to compute the calibrated directional electromagnetic logging measurement.

A fourteenth embodiment includes the thirteenth embodiment, wherein: the first and second transmitters comprise an axial transmitter and a transverse transmitter; the first and second receivers comprise an axial receiver and a transverse receiver; and the processor is configured to: cause the transmitters and the receivers to make a plurality of measurements while the electromagnetic logging tool rotates in the subterranean wellbore, each of the measurements including a plurality of harmonic voltage coefficients computed from voltages measured at one of the receivers when one of the transmitters fires; and process a ratio of selected ones of the harmonic voltage coefficients in combination with the ratio of currents, the ratio of gains, and the test loop calibration coefficient stored in memory to compute the calibrated directional electromagnetic logging measurements.

A fifteenth embodiment includes the fourteenth embodiment, wherein the ratio of selected ones of the harmonic voltage coefficients comprises a ratio of a first harmonic sine voltage coefficient to a DC voltage coefficient.

A sixteenth embodiment includes the fifteenth embodiment, wherein the first harmonic voltage coefficient is a cross coupling voltage coefficient and the DC voltage coefficient is a direct coupling voltage coefficient.

A seventeenth embodiment includes any one of the thirteenth through the sixteenth embodiments, wherein the performing a downhole calibration and the processing a ratio comprise in combination: computing a first ratio and a second ratio of selected harmonic voltage coefficients; multiplying the first ratio by the ratio of currents to obtain a first calibrated ratio; multiplying the second ratio by the ratio of gains to obtain a second calibrated ratio; and multiplying the test loop calibration coefficient by a harmonic average of the first calibrated ratio and the second calibrated ratio to obtain the calibrated directional electromagnetic logging measurements.

In an eighteenth embodiment a method for calibrating an electromagnetic logging tool includes deploying a test loop about an electromagnetic logging tool, the test loop including an axial coil electrically connected in series with a transverse coil, the electromagnetic logging tool including a transmitter and a receiver; and making a calibration measurement using at least one of the transmitter and the receiver while the test loop is deployed about the electromagnetic logging tool.

A nineteenth embodiment includes the eighteenth embodiment wherein: the transmitter and the receiver are spaced apart on the electromagnetic logging tool and the test loop is deployed between the transmitter and the receiver; and the calibration measurement comprises firing the transmitter and measuring a corresponding voltage on the receiver.

A twentieth embodiment includes the eighteenth embodiment wherein: the test loop is deployed about one of the transmitter and the receiver; the calibration measurement comprises at least one of the following: firing the transmitter and measuring a corresponding voltage on the test loop when the test loop is deployed about the transmitter; and firing the test loop and measuring a corresponding voltage on the receiver when the test loop is deployed about the receiver.

Although directional electromagnetic ratio calibration has been described in detail, it should be understood that various changes, substitutions and alternations can be made herein without departing from the spirit and scope of the disclosure as defined by the appended claims.

What is claimed is:

1. A method for making a calibrated directional electromagnetic logging measurement, the method comprising:
   deploying a tool in a subterranean wellbore, the tool including first and second electromagnetic transmitters and first and second electromagnetic receivers;
   causing the tool to make a plurality of measurements while deployed in the subterranean wellbore, each of the plurality of measurements including a voltage measured at one of the first and second electromagnetic receivers when one of the first and second electromagnetic transmitters fires;
   performing a downhole calibration of the first and second electromagnetic transmitters and the first and second electromagnetic receivers, the downhole calibration including computing a ratio of currents in the first and second electromagnetic transmitters and a ratio of gains in the first and second electromagnetic receivers; and
   processing a ratio of selected ones of the measured voltages in combination with the ratio of currents, the ratio of gains, and a test loop calibration coefficient to compute the calibrated directional electromagnetic logging measurement.

2. The method of claim 1, further comprising:
   inverting the calibrated directional electromagnetic logging measurement to determine at least one property of the subterranean formation.

3. The method of claim 2, further comprising:
   changing a direction of drilling in response to the at least one property of the subterranean formation.

4. The method of claim 1, wherein:
   the deploying the tool comprises rotating the tool in the subterranean wellb ore;
   each of the plurality of measurements comprises a plurality of harmonic voltage coefficients; and
   the processing the ratio comprises processing a ratio of selected ones of the harmonic voltage coefficients.

5. The method of claim 4, wherein the tool comprises at least one axial transmitter, at least one transverse transmitter, at least one axial receiver, and at least one transverse receiver; and
   the causing the tool to make a plurality of measurements comprises:
      causing the at least one axial transmitter and the at least one transverse transmitter to sequentially fire while rotating the tool in the subterranean wellbore;
      causing the at least one axial receiver and the at least one transverse receiver to measure corresponding voltages for each of the transmitter firings; and
      processing the voltages measured by the at least one axial receiver and the at least one transverse receiver to compute the corresponding harmonic voltage coefficients.

6. The method of claim 1, wherein:
   the ratio of currents comprises a ratio of a current in a transverse transmitter to a current in an axial transmitter; and
   the ratio of gains comprises a ratio of a voltage measured in measurement electronics in a transverse receiver to a voltage measured in measurement electronics in an axial receiver when a synthesizer is fired.

7. The method of claim 1, wherein the test loop calibration coefficient is a product of a composite test loop ratio, a transmitter current ratio in a test loop measurement, and a receiver gain ratio in the test loop measurement.

8. The method of claim 7, wherein the composite test loop ratio comprises a product of first and second ratios, the first ratio being a ratio of voltages in a transverse receiver and an axial receiver when a test loop fires, and the second ratio being a ratio of voltages in the test loop when an axial transmitter fires and a transverse transmitter fires.

9. The method of claim 1, wherein the performing a downhole calibration and the processing the ratio comprise in combination:
- computing a first ratio and a second ratio of selected harmonic voltage coefficients;
- multiplying the first ratio by the ratio of currents to obtain a first calibrated ratio;
- multiplying the second ratio by the ratio of gains to obtain a second calibrated ratio; and
- multiplying the test loop calibration coefficient by a harmonic average of the first calibrated ratio and the second calibrated ratio to obtain the calibrated directional electromagnetic logging measurement.

10. The method of claim 1, wherein the ratio of the voltages comprises a ratio of a first harmonic voltage coefficient to a DC voltage coefficient.

11. The method of claim 10, wherein the first harmonic voltage coefficient comprises a first harmonic sine voltage coefficient.

12. The method of claim 10, wherein the first harmonic voltage coefficient is a cross coupling voltage coefficient and the DC voltage coefficient is a direct coupling voltage coefficient.

13. An electromagnetic logging tool comprising:
- a logging tool body;
- first and second transmitters deployed on the logging tool body;
- first and second receivers deployed on the logging tool body and spaced apart from the first and second transmitters;
- a processor configured to:
  - cause the first and second transmitters and the first and second receivers to make a plurality of measurements while the electromagnetic logging tool is deployed in a subterranean wellbore, each of the measurements including a voltage measured at one of the first and second receivers when one of the first and second transmitters fires;
  - perform a downhole calibration of the first and second transmitters and the first and second receivers, the downhole calibration including computing a ratio of currents in the first and second transmitters and a ratio of gains in the first and second receivers; and
  - process a ratio of selected ones of the measured voltages in combination with the ratio of currents, the ratio of gains, and a test loop calibration coefficient stored in memory to compute a calibrated directional electromagnetic logging measurement.

14. The electromagnetic logging tool of claim 13, wherein:
- the first and second transmitters comprise an axial transmitter and a transverse transmitter;
- the first and second receivers comprise an axial receiver and a transverse receiver; and
- the processor is configured to:
  - cause the axial and transverse transmitters and the axial and transverse receivers to make a plurality of measurements while the electromagnetic logging tool rotates in the subterranean wellbore, each of plurality of the measurements including a plurality of harmonic voltage coefficients computed from voltages measured at one of the axial and transverse receivers when one of the axial and transverse transmitters fires; and
  - process a ratio of selected ones of the harmonic voltage coefficients in combination with the ratio of currents, the ratio of gains, and the test loop calibration coefficient stored in memory to compute the calibrated directional electromagnetic logging measurement.

15. The method of claim 14, wherein the ratio of selected ones of the harmonic voltage coefficients comprises a ratio of a first harmonic sine voltage coefficient to a DC voltage coefficient.

16. The method of claim 15, wherein the first harmonic voltage coefficient is a cross coupling voltage coefficient and the DC voltage coefficient is a direct coupling voltage coefficient.

17. The method of claim 13, wherein the performing a downhole calibration and the processing a ratio comprise in combination:
- computing a first ratio and a second ratio of selected harmonic voltage coefficients;
- multiplying the first ratio by the ratio of currents to obtain a first calibrated ratio;
- multiplying the second ratio by the ratio of gains to obtain a second calibrated ratio; and
- multiplying the test loop calibration coefficient by a harmonic average of the first calibrated ratio and the second calibrated ratio to obtain the calibrated directional electromagnetic logging measurements.

* * * * *